No. 618,064. Patented Jan. 24, 1899.
T. A. DICKS & W. A. WARMAN.
SAFETY ATTACHMENT FOR PRESSES.
(Application filed June 18, 1898.)
(No Model.) 2 Sheets—Sheet 1.
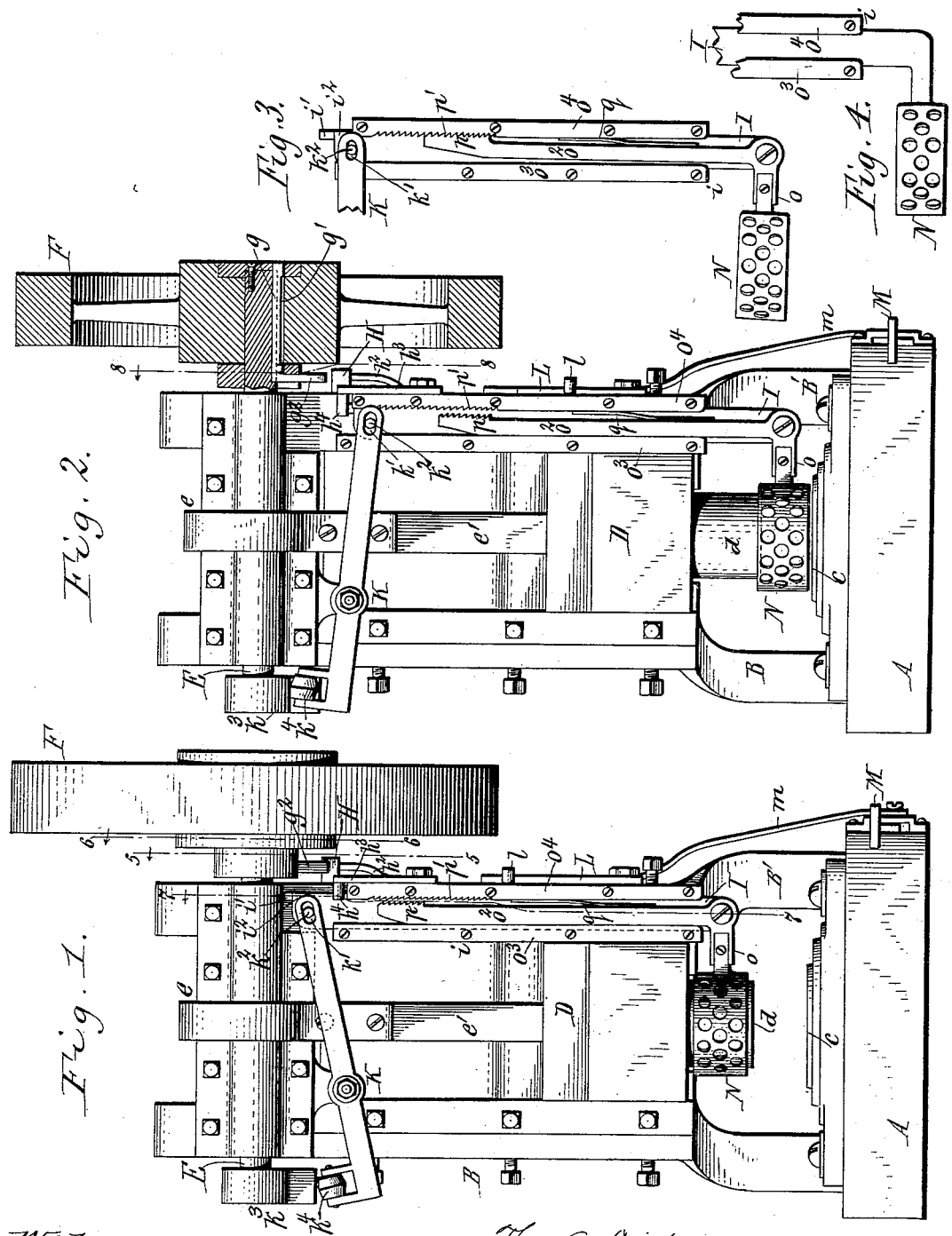
Witnesses:
Henry L. Dick
Chas. F. Burkhart
Thos. A. Dicks
W. A. Warman } Inventors.
By Wilhelm Bonner
Attorneys.

No. 618,064. Patented Jan. 24, 1899.
T. A. DICKS & W. A. WARMAN.
SAFETY ATTACHMENT FOR PRESSES.
(Application filed June 18, 1898.)
(No Model.) 2 Sheets—Sheet 2.
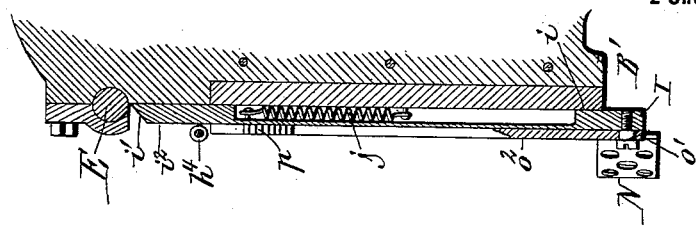
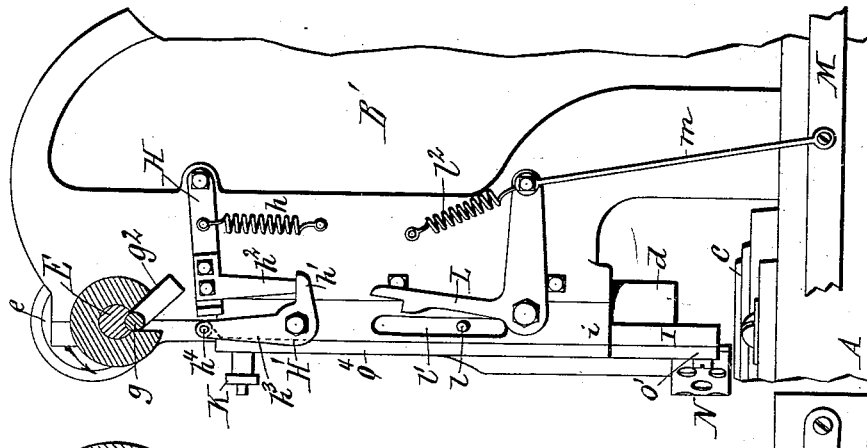
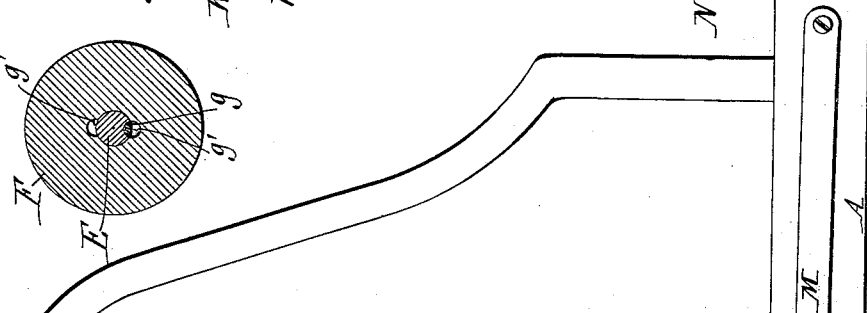
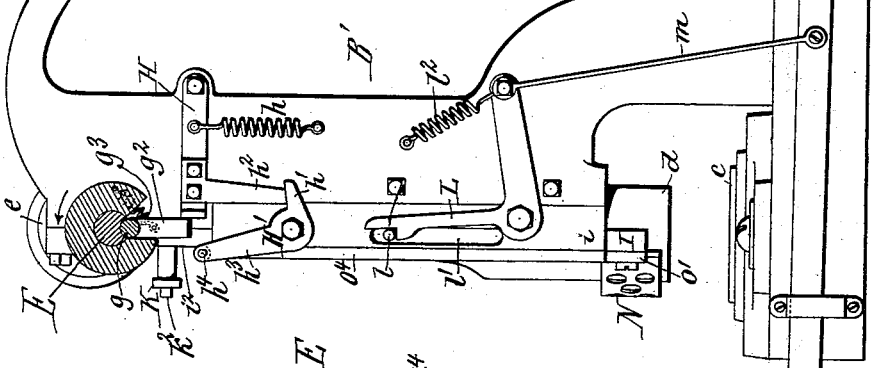
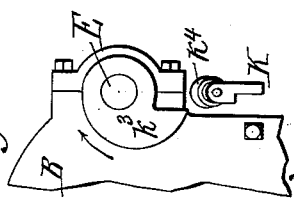
Witnesses:
Henry L. Deck,
Chas. F. Burkhart
Thos. A. Dicks
W. A. Warman } Inventors
By Wilhelm Bonner
Attorneys.

UNITED STATES PATENT OFFICE.

THOMAS A. DICKS, OF BUFFALO, AND WILLIAM A. WARMAN, OF ROCHESTER, NEW YORK.

SAFETY ATTACHMENT FOR PRESSES.

SPECIFICATION forming part of Letters Patent No. 618,064, dated January 24, 1899.

Application filed June 18, 1898. Serial No. 683,801. (No model.)

*To all whom it may concern:*

Be it known that we, THOMAS A. DICKS, a subject of the Queen of Great Britain, residing at Buffalo, in the county of Erie, and WILLIAM A. WARMAN, a citizen of the United States, residing at Rochester, in the county of Monroe, State of New York, have invented new and useful Improvements in Safety Attachments for Presses, of which the following is a specification.

This invention relates to a safety attachment for stamping and other presses whereby injury to the hands of the operator is prevented.

This attachment consists, essentially, of a guard or detector which moves in advance of the punch and which if it encounters the hand of the operator or some other obstruction prevents the punch from moving, but which permits the latter to operate if no obstruction is encountered. An attachment of this character is shown in an application for Letters Patent filed by us June 10, 1896, Serial No. 594,968. In this attachment the work of moving the guard devolves on the operator and requires the treadle controlling the guard and, through the same, the clutch connecting the punch with the driving mechanism to be depressed for every operation of the punch. While this is unobjectionable in presses which are operated by treadles, it is not so desirable in power-presses, in which it increases the work of the operator and reduces the capacity of the machine.

The object of the present invention is to provide a safety attachment of this kind in which the power for moving the guard is derived from the driving mechanism and which permits the press to be run continuously when desired, thereby relieving the operator and maintaining the full capacity of the press.

In the accompanying drawings, consisting of two sheets, Figure 1 is a front elevation of a stamping-press provided with our improved safety attachment and showing the latter in its elevated and inoperative position. Fig. 2 is a similar view showing the driving-clutch in section and the safety attachment in its lower and operative position. Fig. 3 is a fragmentary front elevation of the safety attachment, showing the position of the parts when the guard or detector strikes an obstruction. Fig. 4 is a fragmentary front elevation showing a modified form of the guard or detector. Figs. 5, 6, and 7 are vertical sections in lines 5 5, 6 6, and 7 7, Fig. 1, respectively. Fig. 8 is a fragmentary vertical section in line 8 8, Fig. 2. Fig. 9 is a fragmentary side elevation of the press, viewed from the side opposite to that shown in Figs. 5 and 8.

Like letters of reference refer to like parts in the several figures.

The stamping-press for working on sheet metal or other material shown in the drawings consists, essentially, of a base A, two standards B B', a die c, mounted on the base, a punch d, coöperating with the die and mounted on a vertically-movable cross-head D, which is guided on the standards, a horizontal shaft E, journaled in bearings at the upper end of the standards and having an eccentric or crank e, connected with the cross-head by a rod $e'$, and a continuously-rotating driving wheel or pulley F, which is mounted on one end of the shaft and is coupled therewith or uncoupled therefrom by a clutch, all of which parts may be of any usual or suitable construction. The clutch shown in the drawings is of well-known construction and consists of a coupling-bar g, journaled lengthwise in the shaft and adapted to engage with one of a number of notches $g'$ in the bore of the driving-wheel, Figs. 2 and 6, a depending rock-arm $g^2$, arranged on the inner end of the coupling-bar, and a spring $g^3$, connecting the rock-arm with a collar on the shaft, Fig. 5. Upon turning the coupling-bar so that it does not engage with a notch in the driving-wheel the spring is strained and the driving-wheel rotates without turning the shaft. Upon releasing the rock-arm the latter is turned by the spring together with the coupling-bar, so that the latter engages in one of the notches in the driving-wheel, whereby the wheel and shaft are coupled together and the shaft is turned.

H represents a vertically-movable stop-arm with which the clutch rock-arm $g^2$ is adapted to engage and whereby the latter is moved for uncoupling the clutch. The stop-arm H is pivoted at its rear end to the standard B', and when free it is drawn downwardly by a spring $h$, so that its front end clears the clutch rock-arm, Fig. 8.

H' is a lifting-lever whereby the stop-arm is raised so that its front end stands in the path of the clutch-arm and uncouples the clutch, Fig. 5. The lifting-lever is pivoted on the standard B' and engages with its short lower arm $h'$ against a depending lug $h^2$ of the stop-arm. The upper arm $h^3$ of the lifting-lever is provided with a laterally-projecting roller or lug $h^4$.

I represents a vertically-movable slide which is guided in a way $i$ on the standard B' and which is provided at its upper end with an inclined face $i'$ and below the same with a vertical front face $i^2$, said faces being arranged to engage alternately with the roller $h^4$ of the lifting-lever. Upon raising the slide the incline engages with the roller and guides the same upon the vertical face of the slide, whereby the lifting-lever is turned for raising the stop-arm into its operative position. Upon lowering the slide until its vertical face has cleared the roller of the lifting-lever the stop-arm is turned downward by the spring $h$, and the lifting-lever is thereby swung with its upper arm backward. This releases the clutch-arm $g^2$ and causes the shaft and driving-wheel to be coupled. The downward movement of the slide is effected by gravity, aided, if necessary, by a spring $j$, which connects the slide with the standard B', as shown in Fig. 7.

The upward movement of the slide is effected by the driving mechanism which operates the punch. The means for that purpose shown in the drawings consists of a rock-lever K, which is arranged across the front of the press below the driving-shaft and which is connected with the slide by a slot $k'$, which receives a pin $k^2$ on the slide and which is actuated by a cam $k^3$, secured to the shaft on the opposite side of the press, the adjacent arm of the rock-lever being preferably provided with a roller $k^4$. The slide is held in its elevated position by a catch L, pivoted on the standard B' and adapted to engage under a pin or shoulder $l$ on the slide when the latter is in its elevated position. As shown in Figs. 5 and 8, this pin projects laterally through a vertical slot $l'$ in the guideway. The catch is turned and yieldingly held in engagement with the pin or shoulder of the slide by a spring $l^2$.

M represents a releasing-lever which is connected by a rod $m$ with a rearwardly-projecting arm on the catch. Upon depressing this lever the catch is swung back from under the pin or shoulder of the slide, as shown in Fig. 8, and the slide is free to descend. This releasing-lever is shown in the drawings for convenience as being arranged on the side of the base of the press, in which location it will have to be depressed by the hand of the operator; but most generally it will be arranged on the floor as a treadle, so that the operator can depress it by the foot and have both hands free for manipulating the material operated upon.

N represents the guard or detector, which descends in advance of the punch and controls the operation of the clutch which couples the driving-wheel to the shaft. This guard or detector extends across the front side of the punch and is secured to the lower horizontal arm $o$ of an elbow-lever $o'$. The latter is pivoted to the lower end of the slide, and its upper vertical arm $o^2$ extends upwardly between the gibs $o^3$ $o^4$ of the guideway in which the slide moves. The upper end of the vertical arm of this elbow-lever is provided on its outer side with teeth $p$, which face a vertical row of similar teeth $p'$ on the outer gib $o^4$. The lever is yieldingly held against the inner gib $o^3$, with its teeth out of engagement with the teeth of the outer gib, by a spring $q$, secured to the upper arm of the lever and bearing against the lower smooth portion of the outer gib.

When the machine is at rest, the punch stands in its elevated position, and the detector and connecting parts are also in their elevated position and held in this position by the catch L, as shown in Figs. 1 and 5. In this position of the parts the driving-wheel is uncoupled from the shaft and the punch cannot be operated. In order to start the press, it is necessary to release the catch and drop the detector. This is done by depressing the releasing-lever M, as described. If the space below the detector is obstructed by nothing except the sheet of material or blank to be operated upon, the detector and the slide connected therewith descend to their lowest position, in which position the incline at the upper end of the slide permits the lifting-lever H' to turn with its lower arm downwardly and release the stop-arm H from the clutch-arm $g^2$, thereby coupling the driving-wheel with the shaft and causing the punch to move toward the die and perforate the material. During the upward movement of the punch the detector and slide are also raised by the cam $k^3$, acting upon the rock-lever K. As the slide approaches the limit of its upward movement the incline at its upper end swings the upper arm of the lifting-lever H' forwardly and the lower arm of this lever upwardly, whereby the stop-arm H is swung upwardly into the path of the clutch-arm $g^2$, so that when the latter during its rotation in the direction of the arrow in Fig. 8 strikes the stop-arm it is arrested, thereby turning the coupling-bar in the proper direction for uncoupling the shaft from the driving-wheel. When the operator desires to stop the operation of the press after each effective movement of the punch, he releases the catch L by the releasing-lever for starting the press and then lets go of the releasing-lever, so that the catch locks the slide in its elevated position at the end of the next upward movement of the slide. When the slide is so locked, it holds the stop H in the path of the clutch-arm $g^2$, and this causes the uncoupling of the clutch and the stoppage of the punch. When the operator desires the press to work continuously, he holds the catch out of engagement with the slide by keeping the releasing-lever depressed. In this position of the catch the slide is not locked in its elevated position, but drops as soon as its actuating-cam $k^3$ releases the rock-lever K, which takes place as soon as the slide has finished its upward stroke. If the detector encounters no obstruction during its downward movement, the stop-arm is dropped out of the path of the clutch-arm before the latter has been held long enough to uncouple the clutch, and the rotation of the shaft and the operation of the punch continues. The punch and the detector move up together; but the detector always moves down before the punch begins its next downward movement, and the punch is only allowed to perform its next downward movement if the detector has encountered no obstruction in its downward movement. If the detector has encountered an obstruction, it causes the uncoupling of the shaft before the next downward movement of the punch takes place and so stops the same.

When the detector strikes an obstruction in moving toward the die, the elbow-lever, by which it is connected with the slide, is turned so that the teeth in its upper arm engage with the teeth on the guideway, as shown in Fig. 3. The detector is thus interlocked by this elbow-lever with the frame of the machine, and the weight of the detector, elbow or locking lever, and slide is transferred to the frame instead of resting on the hand of the operator or other obstruction. This is desirable in large presses, in which the weight of these parts may be considerable.

In small presses the detector may be rigidly secured to the slide, as shown in Fig. 4, in which case the weight of the detector and slide rests upon the obstruction which it encounters. The detector is preferably so timed that when it is in its lowest position it incloses the front side of the die and punch until the punch has effected its downward movement and then the detector moves upwardly with the punch, whereby the operator is prevented from obstructing the die after the detector has shifted the parts for operating the punch.

In this construction of safety attachment the attendant releases the detector-slide and the latter operates the clutch, and the attendant is prevented from operating the clutch directly. By this means the coupling of the driving-wheel and shaft is controlled entirely by the position of the detector-slide the latter when dropped to its full extent operating to couple the driving-wheel and shaft, while if the slide does not drop to its full extent it prevents these parts from being coupled.

As the detector and its slide are raised by the actuating mechanism of the punch and lowered by gravity, aided, if necessary, by spring-power, the attendant is relieved from the exertion of moving the detector, the only movement which the attendant is required to perform being to release the catch which holds the detector-slide.

We claim as our invention—

1. The combination with the die, the punch and the mechanism which actuates the punch, of a detector which controls said mechanism and which moves toward the die before the punch makes its effective stroke, and mechanism by which the detector is moved away from the die, which latter mechanism is actuated by the punch-actuating mechanism, and which releases the detector and allows the latter to move toward the die before the punch makes its effective stroke, substantially as set forth.

2. The combination with the die, the punch, the mechanism which actuates the punch, and the driving-clutch, of a detector which controls said driving-clutch and which moves toward the die before the punch makes its effective stroke, and mechanism by which the detector is moved away from the die, and which is actuated by the punch-actuating mechanism, substantially as set forth.

3. The combination with the die, the punch and the mechanism which actuates the punch, of a detector which controls said mechanism and which moves toward the die before the punch makes its effective stroke, a catch whereby the detector is releasably held in its retracted position, and mechanism by which the detector is moved away from the die and which is actuated by the punch-actuating mechanism, substantially as set forth.

4. The combination with the die, the punch and the mechanism which actuates the punch, of a detector which controls said mechanism and which moves toward the die before the punch makes its effective stroke, mechanism by which the detector is moved away from the die and which is actuated by the punch-actuating mechanism and releases the detector before the punch makes its effective stroke, and a catch which prevents the detector, when so released, from moving toward the die until the catch is released by the operator, substantially as set forth.

5. The combination with the die, the punch, and the mechanism which actuates the punch, of a detector which controls said mechanism and which moves toward the die before the punch makes its effective stroke, and a catch which controls the movement of the detector toward the die and prevents such movement unless released by the operator, substantially as set forth.

6. The combination with the die, the punch, and the mechanism which actuates the punch, of a slide which controls said mechanism and which is provided with a detector, a catch whereby the slide and the detector are releasably held in a retracted position, and mechanism by which the slide and detector are moved away from the die and which is actuated by the punch-actuating mechanism, substantially as set forth.

7. The combination with the die, the punch, the mechanism which actuates the punch, and the driving-clutch, of a slide provided with a detector which moves toward the die in advance of the punch, a movable stop-arm adapted to uncouple said clutch, and a lever which moves the stop-arm into its operative position and which is shifted by said slide, substantially as set forth.

8. The combination with the die, the punch, the mechanism which actuates the punch, and the driving-clutch, of a slide controlling said clutch and provided with a detector which moves toward the die in advance of the punch, a rock-lever connected with said slide, and a cam connected with the actuating mechanism of the punch and engaging with said rock-lever, substantially as set forth.

9. The combination with the frame, the die, the punch, the mechanism by which the punch is actuated, and the driving-clutch, of a slide controlling said clutch, and provided with a detector, and a locking device connected with the detector and interlocking the slide and the detector with the frame when the detector strikes an obstruction, substantially as set forth.

10. The combination with the frame, the die, the punch, the mechanism by which the punch is actuated, and the driving-clutch, of a slide controlling said clutch, a detector, and a locking-lever connecting said detector with said slide and adapted to interlock with the frame and support the slide and detector thereon, substantially as set forth.

11. The combination with the die, the punch, the mechanism which actuates the punch, and the driving-clutch, of a slide which controls said clutch and which is provided with a detector and with a pin or shoulder, mechanism whereby said slide is moved away from the die, a catch whereby the slide and detector are locked in an elevated position, and a releasing-lever connected with said catch, substantially as set forth.

12. The combination with the die, the punch, the mechanism which actuates the punch, and the driving-clutch, of a slide which controls said clutch and which is provided at its lower end with a detector and at its upper end with an inclined face, a lifting-lever which is operated by said inclined face, and a stop-arm which is moved by said lifting-lever to uncouple the clutch, substantially as set forth.

Witness my hand this 9th day of June, 1898.

THOS. A. DICKS.

Witnesses:
 JNO. J. BONNER,
 THEO. L. POPP.

Witness my hand this 15th day of June, 1898.

WILLIAM A. WARMAN.

Witnesses:
 F. F. CHURCH,
 T. W. RICH.